(12) United States Patent
Kopp et al.

(10) Patent No.: US 10,102,613 B2
(45) Date of Patent: Oct. 16, 2018

(54) FREQUENCY-DOMAIN DENOISING

(71) Applicant: Google Inc., Mountain View, CA (US)

(72) Inventors: Timothy Kopp, Cheektowaga, NY (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 643 days.

(21) Appl. No.: 14/496,563

(22) Filed: Sep. 25, 2014

(65) Prior Publication Data

US 2016/0094843 A1    Mar. 31, 2016

(51) Int. Cl.
*G06T 5/00* (2006.01)
*G06T 5/10* (2006.01)
(Continued)

(52) U.S. Cl.
CPC ............. *G06T 5/002* (2013.01); *G06T 5/10* (2013.01); *H04N 19/117* (2014.11); *H04N 19/154* (2014.11); *H04N 19/176* (2014.11); *H04N 19/18* (2014.11); *H04N 19/182* (2014.11); *H04N 19/192* (2014.11);
(Continued)

(58) Field of Classification Search
CPC combination set(s) only.
See application file for complete search history.

(56) References Cited

U.S. PATENT DOCUMENTS 3,825,832 A    7/1974    Frei et al.
4,719,642 A    1/1988    Lucas
(Continued)

FOREIGN PATENT DOCUMENTS

EP    0574724    12/1993
EP    0634873    1/1995
(Continued)

OTHER PUBLICATIONS

VP6 Bitstream & Decoder Specification. Version 1.03. On2 Technologies, Inc. Dated Oct. 29, 2007.
(Continued)

*Primary Examiner* — Dave Czekaj
*Assistant Examiner* — Tyler W. Sullivan
(74) *Attorney, Agent, or Firm* — Young Basile Hanlon & MacFarlane, P.C.

(57) ABSTRACT

Encoding and decoding using frequency-domain denoising are provided. Encoding and decoding using frequency-domain denoising may include identifying a current source block from a current source frame from a source video stream, generating a prediction block for the current source block, generating a source transform block by transforming the current source block into the frequency domain, generating a prediction transform block by transforming the prediction block into the frequency domain, generating a denoised transform block based on the source transform block and the prediction transform block, generating a denoised block by inverse transforming the denoised transform block, generating a residual block based on a difference between the denoised block and the prediction block, generating an encoded block by encoding the residual block, and outputting or storing the encoded block.

18 Claims, 8 Drawing Sheets

(51) Int. Cl.
  *H04N 19/117* (2014.01)
  *H04N 19/154* (2014.01)
  *H04N 19/18* (2014.01)
  *H04N 19/48* (2014.01)
  *H04N 19/503* (2014.01)
  *H04N 19/176* (2014.01)
  *H04N 19/182* (2014.01)
  *H04N 19/192* (2014.01)

(52) U.S. Cl.
  CPC ............ *H04N 19/48* (2014.11); *H04N 19/503* (2014.11); *G06T 2207/10016* (2013.01); *G06T 2207/20021* (2013.01); *G06T 2207/20052* (2013.01)

(56) References Cited

U.S. PATENT DOCUMENTS

| | | |
|---|---|---|
| 4,729,127 A | 3/1988 | Chan et al. |
| 4,736,446 A | 4/1988 | Reynolds et al. |
| 4,816,906 A | 3/1989 | Kummerfeldt et al. |
| 4,868,764 A | 9/1989 | Richards |
| 4,891,748 A | 1/1990 | Mann |
| 4,924,310 A | 5/1990 | von Brandt |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,148,269 A | 9/1992 | de Haan et al. |
| 5,164,819 A | 11/1992 | Music |
| 5,270,812 A | 12/1993 | Richards |
| 5,274,442 A | 12/1993 | Murakami et al. |
| 5,278,647 A | 1/1994 | Hingorani et al. |
| 5,313,306 A | 5/1994 | Kuban et al. |
| 5,337,086 A | 8/1994 | Fujinami |
| 5,341,440 A | 8/1994 | Earl et al. |
| 5,361,105 A | 11/1994 | Iu |
| 5,365,280 A | 11/1994 | De Haan et al. |
| 5,377,018 A | 12/1994 | Rafferty |
| 5,398,068 A | 3/1995 | Liu et al. |
| 5,432,870 A | 7/1995 | Schwartz |
| 5,457,780 A | 10/1995 | Shaw et al. |
| 5,461,423 A | 10/1995 | Tsukagoshi |
| 5,488,570 A | 1/1996 | Agarwal |
| 5,512,952 A | 4/1996 | Iwamura |
| 5,561,477 A | 10/1996 | Polit |
| 5,568,200 A | 10/1996 | Pearlstein et al. |
| 5,576,767 A | 11/1996 | Lee et al. |
| 5,579,348 A | 11/1996 | Walker et al. |
| 5,589,945 A | 12/1996 | Abecassis |
| 5,623,308 A | 4/1997 | Civanlar et al. |
| 5,629,736 A | 5/1997 | Haskell et al. |
| 5,640,208 A | 6/1997 | Fujinami |
| 5,659,539 A | 8/1997 | Porter et al. |
| 5,686,962 A | 11/1997 | Chung et al. |
| 5,689,306 A | 11/1997 | Jung |
| 5,696,869 A | 12/1997 | Abecassis |
| 5,706,059 A | 1/1998 | Ran et al. |
| 5,717,791 A | 2/1998 | Labaere et al. |
| 5,721,822 A | 2/1998 | Agarwal |
| 5,731,840 A | 3/1998 | Kikuchi et al. |
| 5,734,744 A | 3/1998 | Wittenstein et al. |
| 5,737,020 A | 4/1998 | Hall et al. |
| 5,748,242 A | 5/1998 | Podilchuk |
| 5,748,247 A | 5/1998 | Hu |
| 5,767,909 A | 6/1998 | Jung |
| 5,774,593 A | 6/1998 | Zick et al. |
| 5,793,647 A | 8/1998 | Hageniers et al. |
| 5,812,197 A | 9/1998 | Chan et al. |
| 5,818,536 A | 10/1998 | Morris et al. |
| 5,818,969 A | 10/1998 | Astle |
| 5,828,370 A | 10/1998 | Moeller et al. |
| 5,877,813 A | 3/1999 | Lee et al. |
| 5,886,742 A | 3/1999 | Hibi et al. |
| 5,903,264 A | 5/1999 | Moeller et al. |
| 5,912,707 A | 6/1999 | Kim |
| 5,926,226 A | 7/1999 | Proctor et al. |
| 5,929,940 A | 7/1999 | Jeannin |
| 5,930,493 A | 7/1999 | Ottesen et al. |
| 5,946,414 A | 8/1999 | Cass et al. |
| 5,959,672 A | 9/1999 | Sasaki |
| 5,963,203 A | 10/1999 | Goldberg et al. |
| 5,969,777 A | 10/1999 | Mawatari |
| 5,985,526 A | 11/1999 | Tutt et al. |
| 5,987,866 A | 11/1999 | Weeger et al. |
| 5,991,447 A | 11/1999 | Eifrig et al. |
| 6,005,980 A | 12/1999 | Eifrig et al. |
| 6,014,706 A | 1/2000 | Cannon et al. |
| 6,041,145 A | 3/2000 | Hayashi et al. |
| 6,061,397 A | 5/2000 | Ogura |
| 6,084,908 A | 7/2000 | Chiang et al. |
| 6,097,842 A | 8/2000 | Suzuki et al. |
| 6,100,940 A | 8/2000 | Dieterich |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,201,896 B1 | 3/2001 | Ishikawa |
| 6,233,279 B1 | 5/2001 | Boon |
| 6,240,135 B1 | 5/2001 | Kim |
| 6,272,179 B1 | 8/2001 | Kadono |
| 6,277,075 B1 | 8/2001 | Torp et al. |
| 6,285,801 B1 | 9/2001 | Mancuso et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,359,929 B1 | 3/2002 | Boon |
| 6,370,267 B1 | 4/2002 | Miller et al. |
| 6,381,277 B1 | 4/2002 | Chun et al. |
| 6,389,072 B1 | 5/2002 | Tzou et al. |
| 6,400,763 B1 | 6/2002 | Wee |
| 6,414,995 B2 | 7/2002 | Okumura et al. |
| 6,418,166 B1 | 7/2002 | Wu et al. |
| 6,473,463 B2 | 10/2002 | Agarwal |
| 6,522,784 B1 | 2/2003 | Zlotnick |
| 6,529,638 B1 | 3/2003 | Westerman |
| 6,535,555 B1 | 3/2003 | Bordes et al. |
| 6,621,867 B1 | 9/2003 | Sazzad et al. |
| 6,661,842 B1 | 12/2003 | Abousleman |
| 6,687,303 B1 | 2/2004 | Ishihara |
| 6,694,342 B1 | 2/2004 | Mou |
| 6,697,061 B1 | 2/2004 | Wee et al. |
| 6,707,952 B1 | 3/2004 | Tan et al. |
| 6,711,211 B1 | 3/2004 | Lainema |
| 6,735,249 B1 | 5/2004 | Karczewicz et al. |
| 6,765,964 B1 | 7/2004 | Conklin |
| 6,798,837 B1 | 9/2004 | Uenoyama et al. |
| 6,807,317 B2 | 10/2004 | Mathew et al. |
| 6,826,229 B2 | 11/2004 | Kawashima et al. |
| 6,904,091 B1 | 6/2005 | Schelkens et al. |
| 6,904,096 B2 | 6/2005 | Kobayashi et al. |
| 6,907,079 B2 | 6/2005 | Gomila et al. |
| 6,934,419 B2 | 8/2005 | Zlotnick |
| 6,985,526 B2 | 1/2006 | Bottreau et al. |
| 6,987,866 B2 | 1/2006 | Hu |
| 7,027,654 B1 | 4/2006 | Ameres et al. |
| 7,031,546 B2 | 4/2006 | Maeda et al. |
| 7,054,367 B2 | 5/2006 | Oguz et al. |
| 7,088,351 B2 | 8/2006 | Wang |
| 7,120,197 B2 | 10/2006 | Lin et al. |
| 7,170,937 B2 | 1/2007 | Zhou |
| 7,194,036 B1 | 3/2007 | Melanson |
| 7,236,524 B2 | 6/2007 | Sun et al. |
| 7,260,148 B2 | 8/2007 | Sohm |
| 7,277,592 B1 | 10/2007 | Lin |
| 7,330,509 B2 | 2/2008 | Lu et al. |
| 7,358,881 B2 | 4/2008 | Melanson |
| 7,447,337 B2 | 11/2008 | Zhang et al. |

(56) References Cited

U.S. PATENT DOCUMENTS

| | | |
|---|---|---|
| 7,492,823 B2 | 2/2009 | Lee et al. |
| 7,499,492 B1 | 3/2009 | Ameres et al. |
| 7,590,179 B2 | 9/2009 | Mukerjee |
| 7,606,310 B1 | 10/2009 | Ameres et al. |
| 7,620,103 B2 | 11/2009 | Cote et al. |
| 7,627,040 B2 | 12/2009 | Woods et al. |
| 7,657,098 B2 | 2/2010 | Lin et al. |
| 7,751,514 B2 | 7/2010 | Tsuie et al. |
| 7,822,286 B2 | 10/2010 | Yea et al. |
| 7,885,476 B2 | 2/2011 | Zhang |
| 7,912,130 B2 | 3/2011 | Suzuki et al. |
| 7,916,783 B2 | 3/2011 | Gao et al. |
| 8,045,813 B2 | 10/2011 | Lee et al. |
| 8,121,196 B2 | 2/2012 | Katsavounidis et al. |
| 8,200,028 B2 | 6/2012 | Gabso et al. |
| 8,218,629 B2 | 7/2012 | Lee et al. |
| 8,218,634 B2 * | 7/2012 | Guleryuz ............ H04N 19/159 375/240.16 |
| 8,259,819 B2 | 9/2012 | Liu et al. |
| 8,295,367 B2 | 10/2012 | Tang et al. |
| 8,325,805 B2 | 12/2012 | Cho et al. |
| 8,638,863 B1 | 1/2014 | Bankoski et al. |
| 8,780,971 B1 | 7/2014 | Bankowski |
| 8,885,706 B2 | 11/2014 | Bankoski et al. |
| 9,131,073 B1 * | 9/2015 | Bankoski ................ H04N 7/00 |
| 9,171,355 B2 * | 10/2015 | Zhuo ...................... G06T 5/002 |
| 9,172,957 B2 | 10/2015 | Grange et al. |
| 2001/0022815 A1 | 9/2001 | Agarwal |
| 2002/0031272 A1 | 3/2002 | Bagni et al. |
| 2002/0036705 A1 | 3/2002 | Lee et al. |
| 2002/0064228 A1 * | 5/2002 | Sethuraman ......... H04N 19/176 375/240.12 |
| 2002/0094130 A1 | 7/2002 | Bruls et al. |
| 2002/0168114 A1 | 11/2002 | Valente |
| 2002/0172431 A1 | 11/2002 | Atkins et al. |
| 2002/0176502 A1 | 11/2002 | Rose et al. |
| 2003/0023982 A1 | 1/2003 | Lee et al. |
| 2003/0039310 A1 | 2/2003 | Wu et al. |
| 2003/0053708 A1 | 3/2003 | Kryukov et al. |
| 2003/0053711 A1 | 3/2003 | Kim |
| 2003/0081850 A1 | 5/2003 | Karczewicz et al. |
| 2003/0165331 A1 | 9/2003 | Van Der Schaar |
| 2003/0189982 A1 | 10/2003 | MacInnis |
| 2003/0194009 A1 | 10/2003 | Srinivasan |
| 2003/0215014 A1 | 11/2003 | Koto et al. |
| 2004/0013308 A1 | 1/2004 | Jeon et al. |
| 2004/0017939 A1 | 1/2004 | Mehrotra |
| 2004/0042549 A1 | 3/2004 | Huang et al. |
| 2004/0047416 A1 | 3/2004 | Tomita |
| 2004/0062307 A1 | 4/2004 | Hallapuro et al. |
| 2004/0080669 A1 | 4/2004 | Nagai et al. |
| 2004/0120400 A1 | 6/2004 | Linzer |
| 2004/0179610 A1 | 9/2004 | Lu et al. |
| 2004/0181564 A1 | 9/2004 | MacInnis |
| 2004/0184533 A1 | 9/2004 | Wang |
| 2004/0228410 A1 | 11/2004 | Ameres et al. |
| 2004/0240556 A1 | 12/2004 | Winger et al. |
| 2005/0013358 A1 | 1/2005 | Song et al. |
| 2005/0013494 A1 | 1/2005 | Srinivasan et al. |
| 2005/0053294 A1 | 3/2005 | Mukerjee et al. |
| 2005/0063475 A1 * | 3/2005 | Bhaskaran ........... H04N 19/176 375/240.29 |
| 2005/0117653 A1 | 6/2005 | Sankaran |
| 2005/0135699 A1 | 6/2005 | Anderson |
| 2005/0147165 A1 | 7/2005 | Yoo et al. |
| 2005/0169374 A1 | 8/2005 | Marpe et al. |
| 2005/0180500 A1 * | 8/2005 | Chiang ................ H04N 19/176 375/240 |
| 2005/0196063 A1 | 9/2005 | Guangxi et al. |
| 2005/0265447 A1 | 12/2005 | Park |
| 2005/0276323 A1 | 12/2005 | Martemyanov et al. |
| 2005/0276327 A1 | 12/2005 | Lee et al. |
| 2005/0286629 A1 | 12/2005 | Dumitras et al. |
| 2006/0013315 A1 | 1/2006 | Song |
| 2006/0062311 A1 | 3/2006 | Sun et al. |
| 2006/0093038 A1 | 5/2006 | Boyce |
| 2006/0098737 A1 | 5/2006 | Sethuraman et al. |
| 2006/0098738 A1 | 5/2006 | Cosman et al. |
| 2006/0126962 A1 | 6/2006 | Sun |
| 2006/0153301 A1 | 7/2006 | Guleryuz |
| 2006/0182181 A1 | 8/2006 | Lee et al. |
| 2006/0215758 A1 | 9/2006 | Kawashima |
| 2006/0239345 A1 | 10/2006 | Taubman et al. |
| 2006/0268990 A1 | 11/2006 | Lin et al. |
| 2007/0009044 A1 | 1/2007 | Tourapis et al. |
| 2007/0009171 A1 | 1/2007 | Nakashizuka et al. |
| 2007/0025448 A1 | 2/2007 | Cha et al. |
| 2007/0047648 A1 | 3/2007 | Tourapis et al. |
| 2007/0064815 A1 * | 3/2007 | Alvarez ............... H04N 19/615 375/240.29 |
| 2007/0081593 A1 | 4/2007 | Jeong et al. |
| 2007/0098067 A1 | 5/2007 | Kim et al. |
| 2007/0110152 A1 | 5/2007 | Lee et al. |
| 2007/0116125 A1 | 5/2007 | Wada et al. |
| 2007/0140338 A1 | 6/2007 | Bhaskaran et al. |
| 2007/0140342 A1 | 6/2007 | Karczewicz et al. |
| 2007/0156986 A1 | 7/2007 | Neiger et al. |
| 2007/0171988 A1 | 7/2007 | Panda et al. |
| 2007/0177673 A1 | 8/2007 | Yang |
| 2007/0189735 A1 | 8/2007 | Kawashima et al. |
| 2007/0201559 A1 | 8/2007 | He |
| 2007/0230572 A1 | 10/2007 | Koto et al. |
| 2007/0237241 A1 | 10/2007 | Ha et al. |
| 2007/0253483 A1 | 11/2007 | Lee et al. |
| 2007/0253490 A1 | 11/2007 | Makino |
| 2007/0253491 A1 | 11/2007 | Ito et al. |
| 2007/0274385 A1 | 11/2007 | He |
| 2007/0274388 A1 | 11/2007 | Lee et al. |
| 2008/0025398 A1 | 1/2008 | Molloy et al. |
| 2008/0025411 A1 | 1/2008 | Chen et al. |
| 2008/0080615 A1 | 4/2008 | Tourapis et al. |
| 2008/0101469 A1 | 5/2008 | Ishtiaq et al. |
| 2008/0130755 A1 | 6/2008 | Loukas et al. |
| 2008/0159649 A1 | 7/2008 | Kempf et al. |
| 2008/0170629 A1 | 7/2008 | Shim et al. |
| 2008/0198931 A1 | 8/2008 | Chappalli et al. |
| 2008/0212678 A1 | 9/2008 | Booth et al. |
| 2008/0219351 A1 | 9/2008 | Kim et al. |
| 2008/0253457 A1 | 10/2008 | Moore |
| 2008/0279279 A1 | 11/2008 | Liu et al. |
| 2008/0298472 A1 | 12/2008 | Jain et al. |
| 2009/0003440 A1 | 1/2009 | Karczewicz et al. |
| 2009/0003717 A1 | 1/2009 | Sekiguchi et al. |
| 2009/0034617 A1 | 2/2009 | Tanaka |
| 2009/0161770 A1 | 6/2009 | Dong et al. |
| 2009/0185058 A1 | 7/2009 | Vakrat et al. |
| 2009/0190660 A1 | 7/2009 | Kusakabe et al. |
| 2009/0195535 A1 * | 8/2009 | Kanumuri ............ G06F 17/145 345/418 |
| 2009/0196351 A1 | 8/2009 | Cho et al. |
| 2009/0287493 A1 | 11/2009 | Janssen et al. |
| 2009/0316793 A1 | 12/2009 | Yang et al. |
| 2009/0324117 A1 * | 12/2009 | Demandolx ............ G06K 9/40 382/254 |
| 2010/0008417 A1 | 1/2010 | Xu et al. |
| 2010/0022815 A1 | 1/2010 | Chikamatsu et al. |
| 2010/0027906 A1 | 2/2010 | Hara et al. |
| 2010/0061645 A1 | 3/2010 | Wilkins et al. |
| 2010/0208944 A1 | 8/2010 | Fukunishi |
| 2011/0007799 A1 | 1/2011 | Karczewicz et al. |
| 2011/0116549 A1 | 5/2011 | Sun |
| 2011/0141237 A1 | 6/2011 | Cheng et al. |
| 2011/0228841 A1 * | 9/2011 | Suzuki ................. H04N 19/117 375/240.03 |
| 2011/0228843 A1 | 9/2011 | Narroschke et al. |
| 2011/0229029 A1 | 9/2011 | Kass |
| 2011/0268182 A1 | 11/2011 | Joshi |
| 2012/0008870 A1 | 1/2012 | Nguyen et al. |
| 2012/0039383 A1 | 2/2012 | Huang et al. |
| 2012/0051438 A1 * | 3/2012 | Chong ................. H04N 19/176 375/240.25 |
| 2012/0063513 A1 | 3/2012 | Grange et al. |
| 2012/0081566 A1 | 4/2012 | Cote et al. |
| 2012/0081580 A1 | 4/2012 | Cote et al. |

(56) References Cited

U.S. PATENT DOCUMENTS

| | | | |
|---|---|---|---|
| 2012/0082580 A1 | 4/2012 | Tsuboi et al. | |
| 2012/0257679 A1 | 10/2012 | Bankoski et al. | |
| 2013/0028327 A1* | 1/2013 | Narroschke | H04N 19/147 375/240.16 |
| 2013/0114679 A1 | 5/2013 | Wilkins et al. | |
| 2013/0121416 A1* | 5/2013 | He | H04N 19/597 375/240.14 |
| 2013/0208790 A1* | 8/2013 | Davies | H04N 19/619 375/240.03 |
| 2014/0112481 A1* | 4/2014 | Li | G10L 19/008 381/23 |

FOREIGN PATENT DOCUMENTS

| | | |
|---|---|---|
| EP | 0771507 | 5/1997 |
| EP | 0777388 | 6/1997 |
| EP | 0779742 | 6/1997 |
| EP | 0781491 | 7/1997 |
| EP | 1351510 | 10/2003 |
| EP | 1365590 | 11/2003 |
| EP | 1499114 A2 | 1/2005 |
| EP | 1511319 | 3/2005 |
| EP | 1555832 | 7/2005 |
| EP | 1564997 | 8/2005 |
| EP | 1838108 | 9/2007 |
| EP | 1840875 | 10/2007 |
| EP | 1933566 A2 | 6/2008 |
| EP | 2076045 | 7/2009 |
| JP | 61092073 | 5/1986 |
| JP | 2217088 | 8/1990 |
| JP | 2272970 | 11/1990 |
| JP | 06038197 | 2/1994 |
| JP | 09037246 | 7/1997 |
| JP | 09179987 | 7/1997 |
| JP | 11262018 | 9/1999 |
| JP | 11289544 | 10/1999 |
| JP | 8280032 | 11/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| JP | 2005503737 | 2/2005 |
| JP | 2005308623 | 11/2005 |
| JP | 2008154221 | 7/2008 |
| KR | 100213018 | 8/1999 |
| KR | 200130916 | 4/2001 |
| KR | 1020050018730 | 2/2005 |
| KR | 1020080056083 | 6/2008 |
| WO | WO9904574 | 1/1999 |
| WO | WO0150770 | 7/2001 |
| WO | WO2002089487 | 11/2002 |
| WO | WO03026315 | 3/2003 |
| WO | WO20060602377 | 6/2006 |
| WO | WO2006083614 | 8/2006 |
| WO | WO2007052303 | 5/2007 |
| WO | WO2008005124 | 1/2008 |
| WO | WO2010077325 | 7/2010 |
| WO | WO2012123855 | 9/2012 |

OTHER PUBLICATIONS

VP8 Data Format and Decoding Guide. WebM Project. Google On2. Dated: Dec. 1, 2010.

Wenger et al.; RTP Payload Format for H.264 Video; The Internet Society; Feb. 2005.

Wiegand et al, "Overview of the H 264/AVC Video Coding Standard," IEEE Transactions on Circuits and Systems for Video Technology, vol. 13, No. 7, pp. 568, 569, Jul. 1, 2003.

Wiegand, Digital Image Communication: Pyramids and Subbands, 21 pages.

Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Wu, Xiaolin, et al., "Calic—A Context based Adaptive :oss;ess Image Codec", 1996 IEEE International Conferece, vol. 4, 4 pages.

Zhang, Kui, et al.; "Variable Block Size Video Coding With Motion Prediction and Motion Segmentation", SPIE vol. 2419, 1995, 9 pp.

Zhi Liu, Zhaoyang Zhang, Liquan Shen, Mosaic Generation in H.264 Compressed Domain, IEEE 2006.

A High Efficient Method for Parallelizing Reconstructor & Loop Deblocking Filter on Multi-core Processor Platform, Feb. 2008.

An Optimized In-Loop H.264 De-Blocking Filter on Multi-Core Engines, Feb. 2007.

Architectures for Efficient Partitioning of Video Coding Algorithms— H. 264 decoder, Nov. 2006.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

Ebrahimi, Touradj, et al.; "Joint motion estimation and segmentation for very low bitrate video coding", SPIE vol. 2501, 1995, 12 pp.

Guillotel, Philippe, et al.; "Comparison of motion vector coding techniques", SPIE vol. 2308, 1994, 11 pp.

Hsiang, Anatialiasing Spatial Scalable Subband/Wavelet Coding Using H.264/AVC, 4 pages.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

International Telecommunications Union, ITU-T, Telecommunication Standardization Section of ITU, "Series H: Audiovisual and Multimedia Systems, Infrastructure of audiovisual services— Coding of moving video", Mar. 2010, 676 pp.

ISR and th eWritten Opinion of the International Searching Authority for International Application No. PCT/US2012/055386, dated Nov. 7, 2012, 17 pages.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Lee, Yung-Lyul; Park, Hyun Wook; "Loop Filtering and Post-Filtering for Low-Bit-Rates Moving Picture Coding", Signal Processing: Image Communication 16 (2001) pp. 871-890.

Lihua Zhu, Guangfei Zhu, Charles Wang; Implementation of video deblocking filter on GPU Apr. 8, 2008.

(56) References Cited

OTHER PUBLICATIONS

Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Method for unloading YUV-filtered pixels from a deblocking filter for a video decoder, Oct. 11, 2006.
Mohmoudi, Mona et al.; "Fast Image and video Denoising via Nonlocal Means of Similar Neighborhoods"; IEEE Signal Processing Letters vol. 12, No. 12, Dec. 2005.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
ON2 Technologies Inc., White Paper TrueMotion VP7 Video Codec, Jan. 10, 2005, 13 pages, Document Version: 1.0, Clifton Park, New York.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sikora, T. et al., Shape-adaptive DCT for generic coding of video, Circuits and Systems for Video Technology, IEEE Transactions on vol. 5, Issue 1, p. 59-62, Feb. 1, 1995.
Soon Hie Tan et al., "Classified Perceptual Coding with Adaptive Quantization", IEEE Transactions on Circuits and Systems for Video Technology, IEEE Service Center, Piscataway, NJ, US, vol. 6, No. 4, Aug. 1, 1996.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Sye-Hoon Oh, et al. "An Adaptive Sharpening Filter Using Quantization Step Size and Pixel Variance in H.264/AVC", Consumer Electronics (ICCE), IEEE International Conference on Jan. 9, 2011.
Tanaka et al., A New Combination of 1D and 2D Filter Banks for effective Multiresolution Image Representation, ICIP, 2008, pp. 2820-2823, IEEE.
Tanaka et al., An adaptive extension of combined 2D and 1D directional filter banks, Circuits and Systems, 2009. ISCAS 2009. IEEE International Symposium on, On pp. 2193-2196.
VP6 Bitstream & Decoder Specification. Version 1.02. On2 Technologies, Inc. Dated Aug. 17, 2006.
International Search Report & Written Opinion, Re: Application # PCT/US2015/042599; dated Nov. 10, 2015.
Duijas Johnathan et al., Removing JPEG Blocking Artifacts Using Machine Learning, Southwest Symposium on Image Analysis and Interpretation, Apr. 6, 2014, pp. 77-80.
Rusanovskyy et al., Video Denoising Algorithm in Sliding 3D DCT Domain, Advanced Concepts for Intelligent Vision Systems Lecture Notes in Computer Science; Springer, Berlin, DE pp. 618-625, Jan. 1, 2005.
European Office Action for EP09813582.5 dated Jan. 15, 2016, 5 pages.
Lee 1Y-L et al. "Loop filtering and post-filtering for low-bit-rates moving picture coding", Signal Processing Image Communication Lsevier Science Publishers, Amsterdam, NL vol. 16, No. 9, Jun. 1, 2001 pp. 371-890.
Dai, JingJing et al., "Film Grain Noise Removal and Synthesis in Video Coding", 2010 IEEE, pp. 890-893.
Mohammed Aree A., et al., "Adaptive Quantization for Video Compression in Frequency Domain", Retrieved from the internet >URL http://www.univsul.org/Dosekan_Mamostakan_U/acs15.pdf>.
Mozilla, "Introduction to Video Coding Part 1: Transform Coding", Video Compression Overview, Mar. 2012, 171 pp.
Raza, Zahir, "Design of Sample Adaptive Product Quantizers for Noisy Channels", IEEE Transactions on Communications, vol. 53, No. 4, Apr. 2005, pp. 576-580.
Recent Trends in Denoising tutorial: Selected Publications; 2007 IEEE International symposium on Information theory (ISIT2007). Http://www.stanford.edu/~slansel/tutorial/publications.htm. Feb., 2012.
Tan et al., "Classified Perceptual Caoding with Adaptive Quantization," IEEE Transactions on Circuits and Systems for Video Technology, Aug. 1996, pp. 375-388, vol. 6 No. 4.
Video denoising; http://en.wikipedia.org/wiki/Video_denoising.com. Feb. 2012.

\* cited by examiner

FREQUENCY-DOMAIN DENOISING

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using frequency-domain denoising.

An aspect is a method for performing frequency-domain denoising, which may be performed by a processor in response to instructions stored on a non-transitory computer readable medium, and which may include identifying a current source block from a current source frame from a source video stream, generating a prediction block for the current source block, generating a source transform block by transforming the current source block into the frequency domain, and generating a prediction transform block by transforming the prediction block into the frequency domain. In some implementations, frequency-domain denoising may include generating a denoised transform block based on the source transform block and the prediction transform block, generating a denoised block by inverse transforming the denoised transform block, generating a residual block based on a difference between the denoised block and the prediction block, generating an encoded block by encoding the residual block, and outputting or storing the encoded block.

Another aspect is a method for performing frequency-domain denoising, which may be performed by a processor in response to instructions stored on a non-transitory computer readable medium, and which may include identifying a current source block from a current source frame from a source video stream, generating an encoded block by encoding the current source block using frequency-domain denoising, and outputting or storing the encoded block.

Another aspect is a method for frequency-domain denoising, which may be performed by a processor in response to instructions stored on a non-transitory computer readable medium, and which may include identifying a current source block from a current source frame from a source video stream, generating a prediction block for the current source block, generating a source transform block by transforming the current source block into the frequency domain, and generating a prediction transform block by transforming the prediction block into the frequency domain. In some implementations, frequency-domain denoising may include generating a denoised transform block by applying a denoising function to the source transform block based on the prediction transform block, generating a denoised block by inverse transforming the denoised transform block, generating a residual block based on a difference between the denoised block and the prediction block, generating an encoded block by encoding the residual block, and outputting or storing the encoded block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video may be used for various purposes including, for example, remote business meetings via video conferencing, high definition video entertainment, video advertisements, and sharing of user-generated videos. Digital video streams may represent video using a sequence of frames or images. Each frame can include a number of blocks, which may include information indicating pixel attributes, such as color values or brightness. Transmission and storage of video can use significant computing or communications resources. Compression and other coding techniques may be used to reduce the amount of data in video streams.

The utility of a video coder may depend on compression speed, compression performance, compression fidelity, and decoded visual quality. Compression speed may indicate the time utilized to compress a video. Compression performance may represent the difference in bandwidth required for storing or transmitting the encoded video compared to the source video. Compression fidelity may indicate how well a decoded video matches the source video. Decoded visual quality may represent the visual quality of a decoded video, which may be subjective. In some implementations, noise, or other undesired artifacts, captured in the input video signal may reduce the utility of a video coder. For example, input noise, which may be random, unpredictable noise, may be propagated to the decoded video and may reduce decoded visual quality. In some implementations, input noise may reduce compression speed, compression performance, and compression fidelity.

In some implementations, frequency-domain denoising may improve compression speed, compression performance, compression fidelity, and decoded visual quality by removing noise from an input video stream prior to, or during, video coding. In some implementations, frequency-domain denoising may include identifying variable size source blocks from a current frame of a source video stream and generating a denoised block for each source block using a frequency-domain denoising function. In some implementations, denoising a block may include generating a prediction block for the source block, transforming the source block and the prediction block into the frequency domain, denoising the source transformed block using the frequency-domain denoising function based on the prediction transformed block, and inverse transforming the denoised block.

Figure 1:
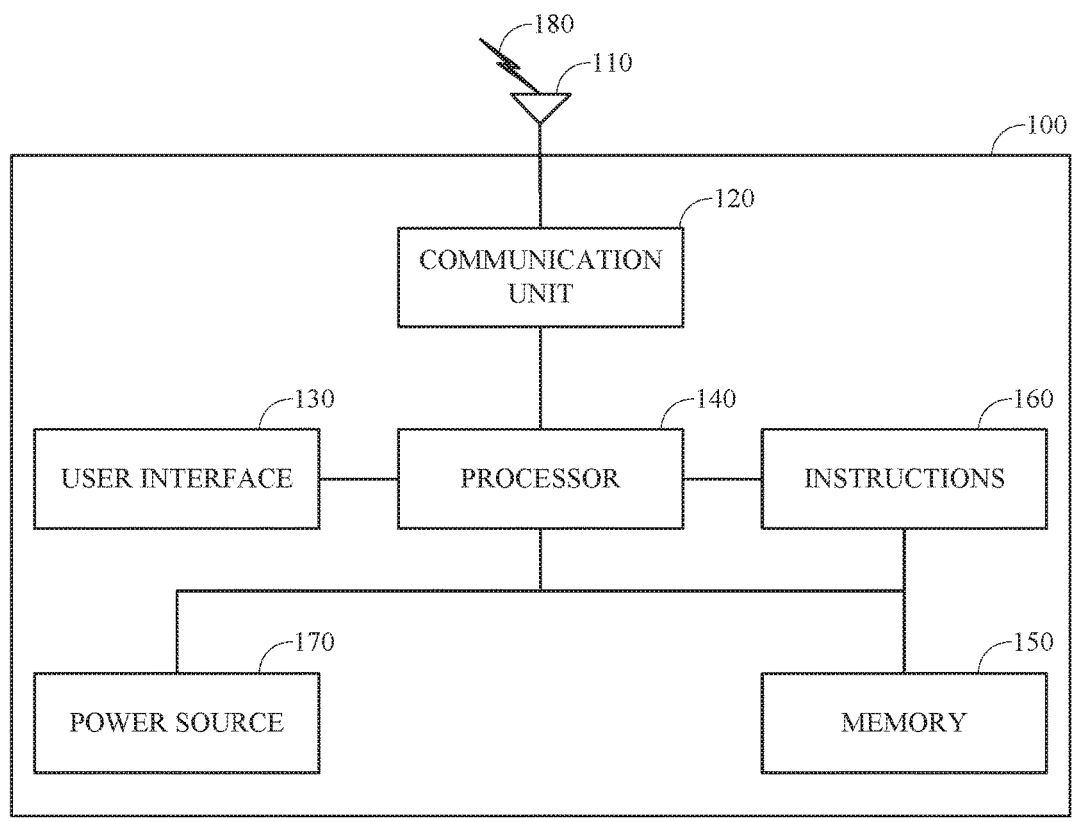
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
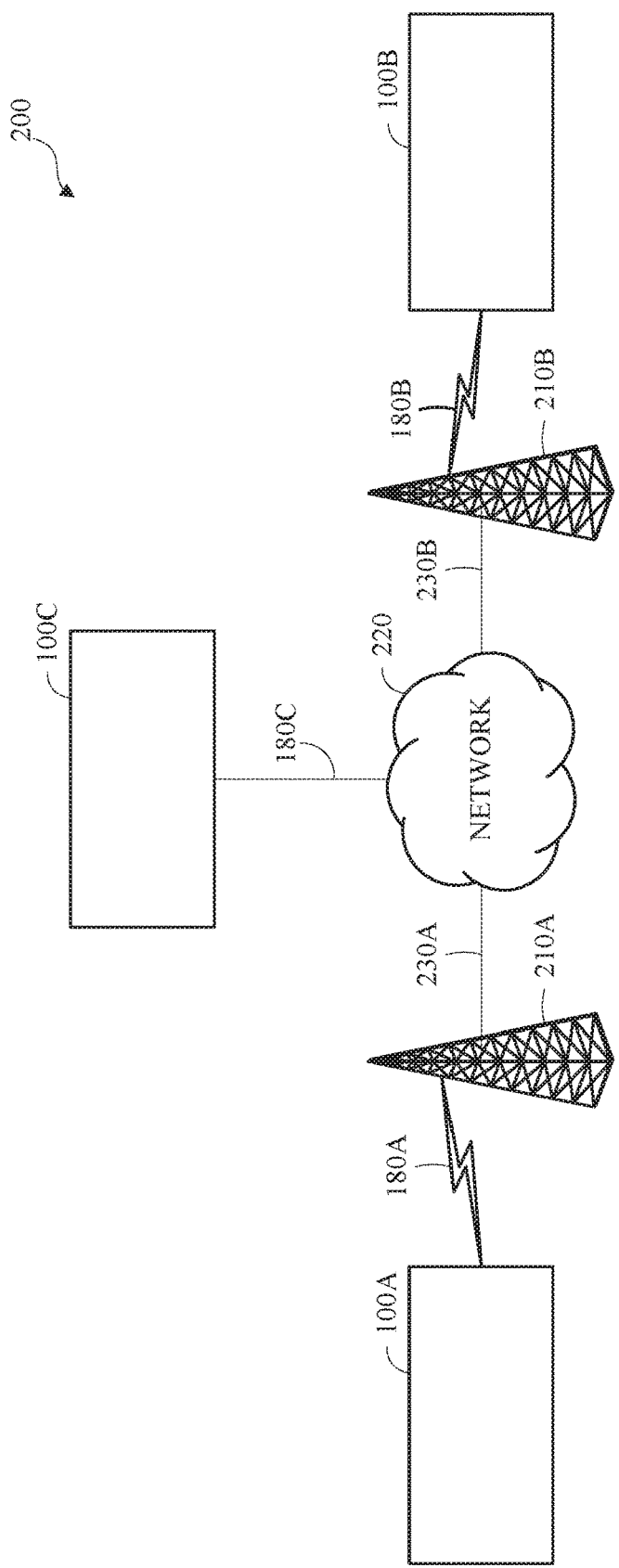
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
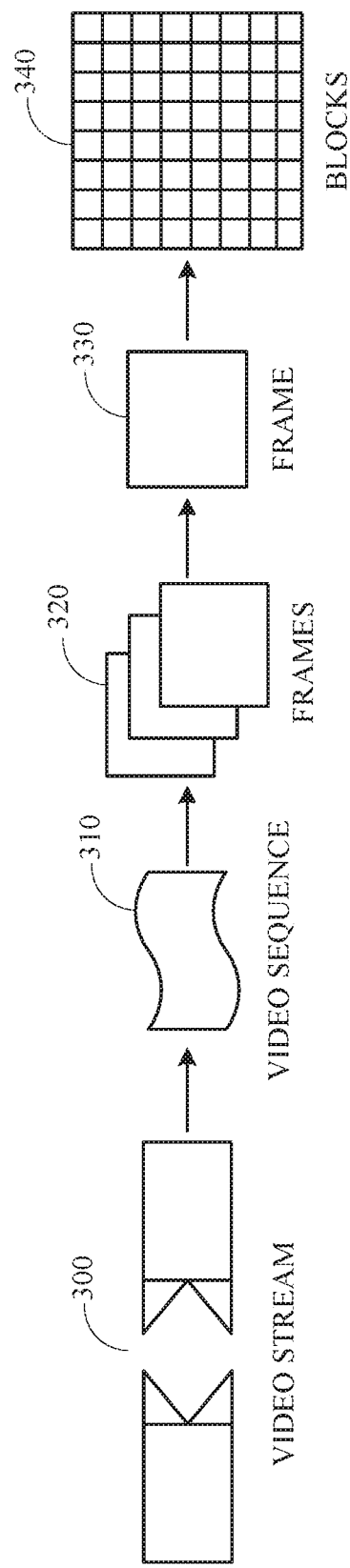
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
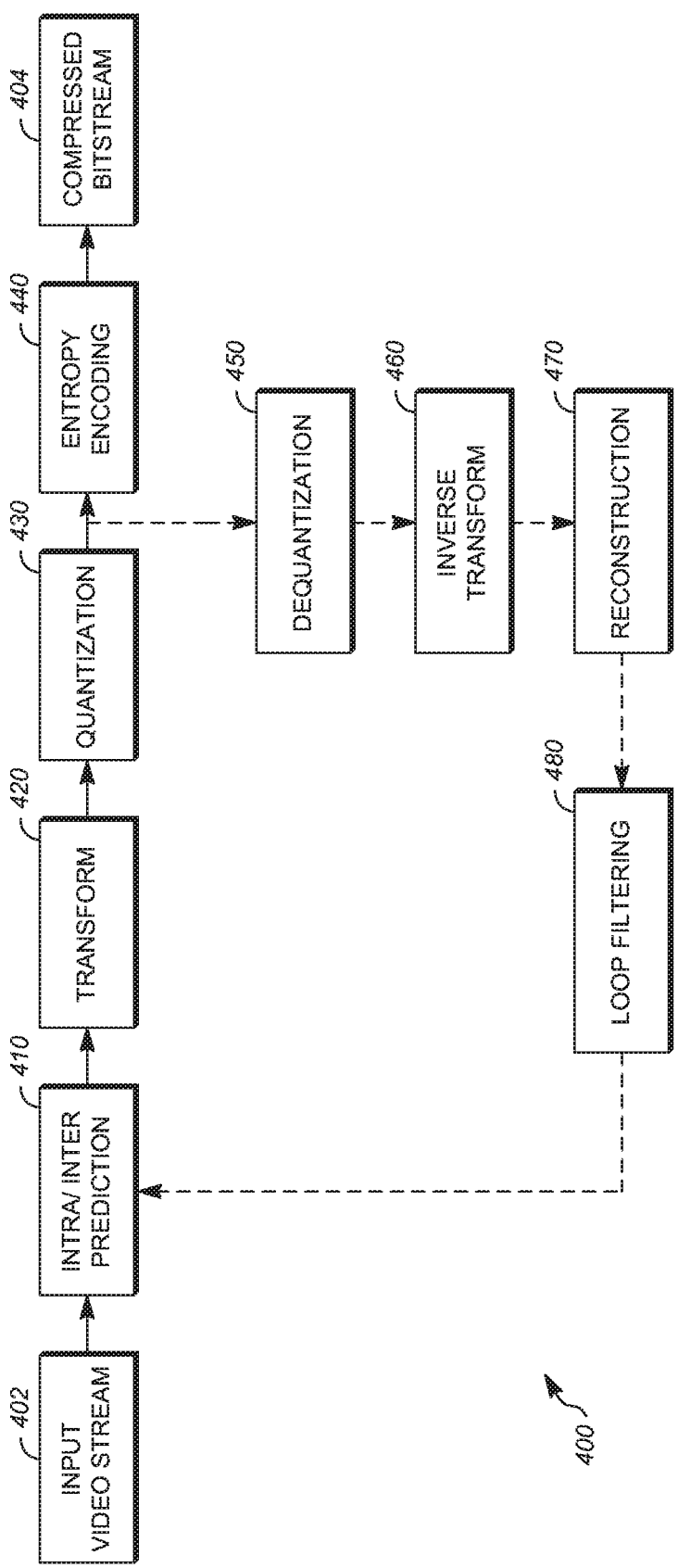
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a denoise unit 425, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block, or current source block, may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
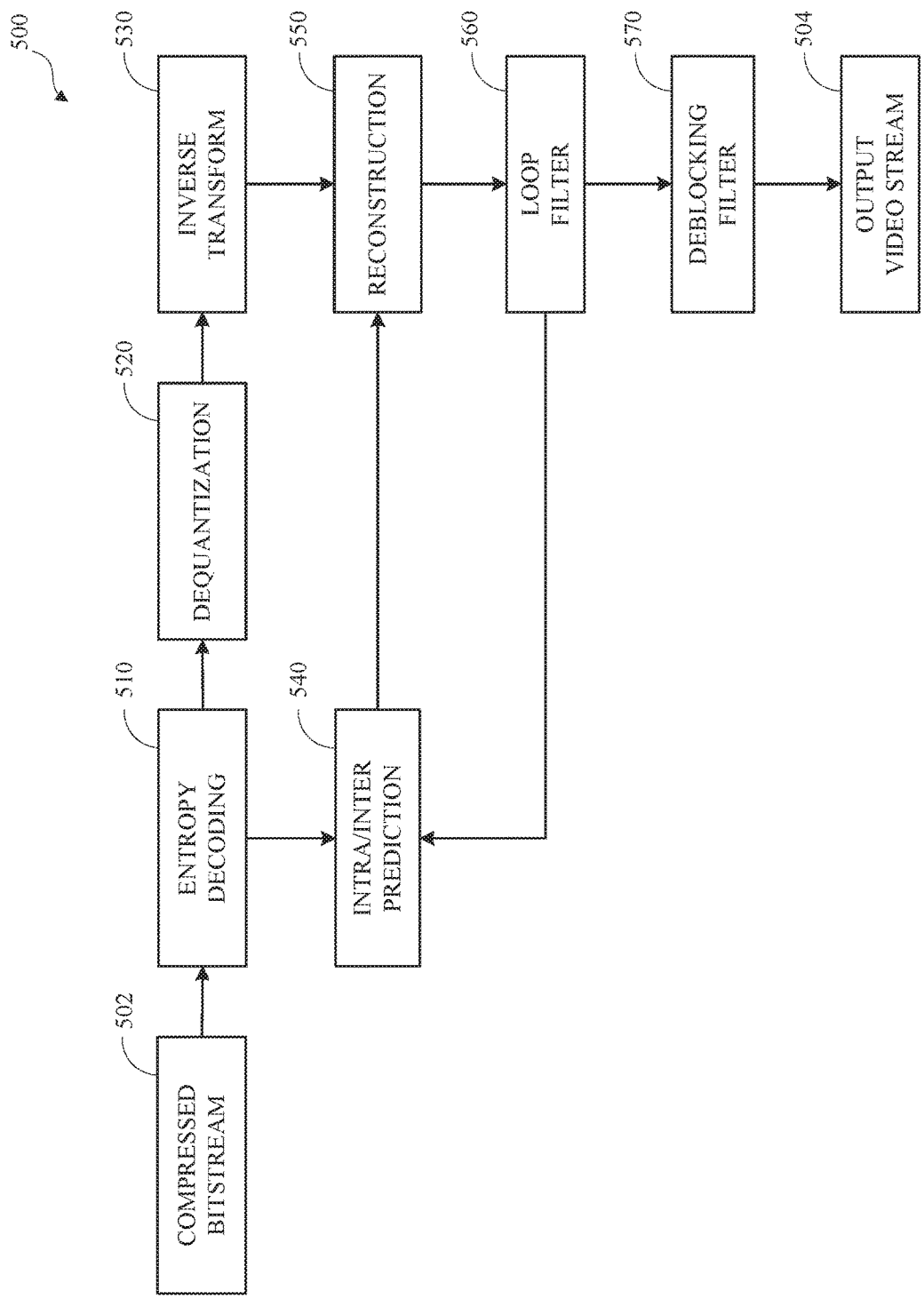
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
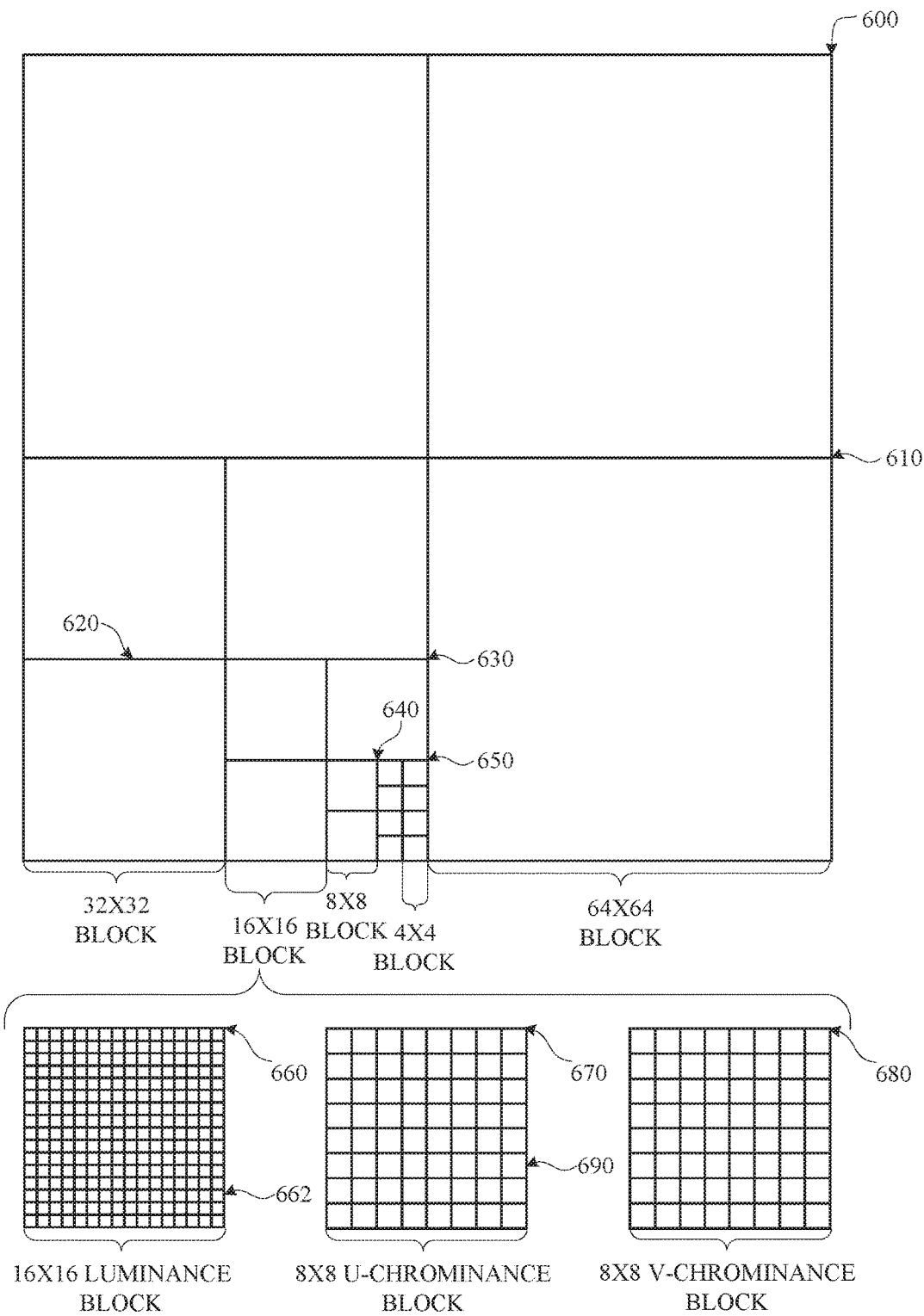
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, which may be referred to as superblocks, in two rows and two columns in a matrix or Cartesian plane. In some implementations, a superblock may be a basic or maximum coding unit. Each superblock may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the superblock in the top row and left column of a frame may be the first block coded and the superblock immediately to the right of the first block may be the second block coded. The second row from the top may be the second row coded, such that the superblock in the left column of the second row may be coded after the superblock in the rightmost column of the first row.

In some implementations, coding a block may include using quad-tree coding, which may include coding smaller block units with a block in raster-scan order. For example, the 64×64 superblock shown in the bottom left corner of the portion of the frame shown in FIG. 6, may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although frequency-domain denoising is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, the process of capturing, or recording, video may be subject to noise, or other undesired artifacts. For example, factors such as imperfections in camera manufacture, lighting, or the like, may contribute to noise in the input, source, or raw images. Noise in the source video may decrease perceived video quality and may reduce video coding efficiency. For example, input noise, which may be random, unpredictable noise, may be propagated to the decoded video and may reduce decoded visual quality. In some implementations, input noise may reduce compression speed, compression performance, and compression fidelity.

Figure 7:
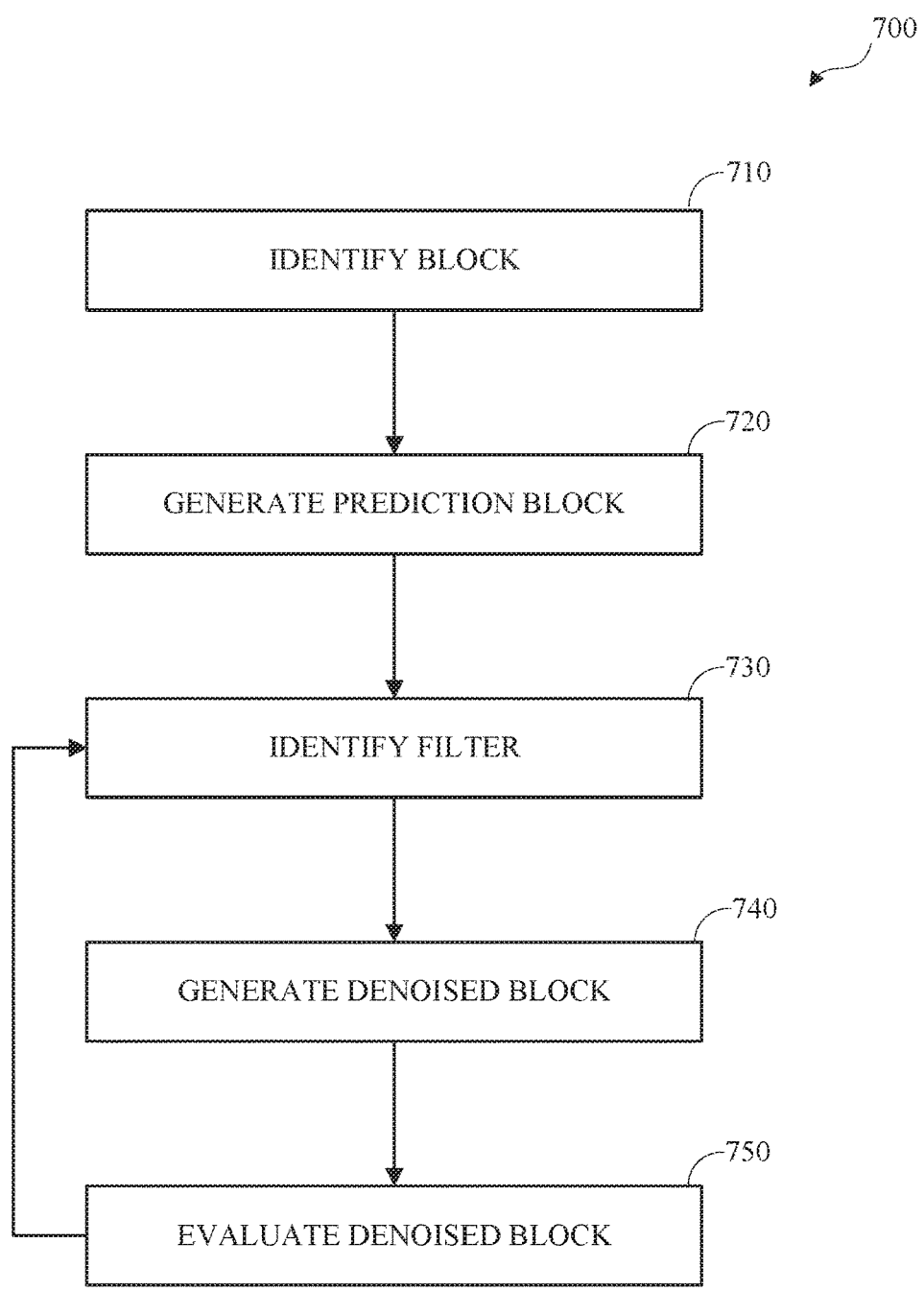
FIG. 7 is a diagram of an example of coding a video stream using temporal-domain denoising in accordance with implementations of this disclosure.

FIG. 7 is a diagram of an example of coding a video stream using temporal-domain denoising in accordance with implementations of this disclosure. In some implementations, an encoder, such as the encoder 400 shown in FIG. 4, may receive an input video stream, such as the input video stream 402 shown in FIG. 4, may encode the input video stream, such as the encoding shown in FIG. 4, and may output an encoded video stream, such as the compressed bitstream 404 shown in FIG. 4. In some implementations, encoding the video stream may include temporal-domain denoising 700. For example, an encoder, such as the encoder 400 shown in FIG. 4, may include a denoising unit (not shown separately), which may generate a denoised frame, or a portion thereof, based on the source frame, or a portion thereof, and a predicted frame, or a portion thereof, such as the predicted frame generated by the prediction unit 410 shown in FIG. 4. In some implementations, the encoder may include a combined prediction and denoising unit. For example, the prediction unit 410 of the encoder 400 shown in FIG. 4 may include a denoising unit.

In some implementations, temporal-domain denoising 700 may include identifying a source block at 710, generating a prediction block at 720, identifying a filter at 730, generating a denoised block at 740, evaluating the denoised block at 750, or a combination thereof. In some implementations, temporal-domain denoising 700 may include temporal denoising wherein the value of a denoised pixel may be based on the value of the pixel in the current frame and a corresponding pixel in a reference frame.

In some implementations, a source block may be identified at 710. In some implementations, a current frame of the input, or source, video stream may include multiple N×N blocks, such as 16×16 blocks, and a block from the source frame may be identified as the source block. In some implementations, each block from the source frame may be denoised on a block-by-block basis.

In some implementations, a prediction block may be generated at 720. For example, a prediction block may be generated based on a reference frame using inter-prediction, such as the inter-prediction 410 shown in FIG. 4.

In some implementations, a filter may be identified at 730. In some implementations, a filter may generate a filtered pixel that has a value between a value of a source pixel from the source block and a value of a corresponding predicted pixel from the prediction block. In some implementations, a filter may have a strength, which may indicate a relative weight of the source pixel and the predicted pixel. For example, a strong filter may generate a filtered pixel that has a value that is closer to the value of the predicted pixel than the value of the source pixel and a weak filter may generate a filtered pixel that has a value that is closer to the value of the source pixel than the value of the predicted pixel. In some implementations, a filter may be identified from a set of candidate temporal denoising filters having a variety of strengths. In some implementations, the strongest available filter may be selected.

In some implementations, a denoised block may be generated at 740. For example, the denoised block may be generated by applying the selected filter to filter the source block based on the prediction block. In some implementations, each pixel from the source block may be filtered on a pixel-by-pixel basis based on the corresponding pixel from the prediction block. For example, the pixels from the source block may be processed in a scan order, such as raster scan order.

In some implementations, the denoised block may be evaluated at 750. In some implementations, evaluating the denoised block may include determining a difference between the denoised block and the source block. In some implementations, the denoised block may be rejected or accepted based on whether the difference is within a fidelity threshold. For example, the difference between the denoised block and the source block may be within the fidelity threshold and the denoised block may be accepted.

In some implementations, identifying a filter at 730, generating a denoised block at 740, and evaluating the denoised block at 750 may be repeated iteratively using successively weaker filters, until an acceptable denoised block is identified. In some implementations, the source block may be used as the denoised block. For example, the set of available filters may include a strong filter and a weak filter, the strong filter may be identified at 730, a strongly filtered denoised block may be generated at 740, the strongly filtered denoised block may be evaluated at 750, the difference between the strongly filtered denoised block and the source block may exceed the fidelity threshold, the strongly filtered denoised block may be rejected, the weak filter may be identified at 730, a weakly filtered denoised block may be generated at 740, the weakly filtered denoised block may be evaluated at 750, the difference between the weakly filtered denoised block and the source block may exceed the fidelity threshold, the weakly filtered denoised block may be rejected, and the source block, without denoising, may be used as the denoised block.

Although not shown separately in FIG. 7, each block from the current frame may be denoised on a block-by-block basis, such as in raster scan order. In some implementations, encoding using temporal-domain denoising may include using the denoised block to generate the residual block. For example, a prediction unit, such as the prediction unit 410 shown in FIG. 4, may generate the residual based on the difference between the source frame and the denoised frame.

Figure 8:
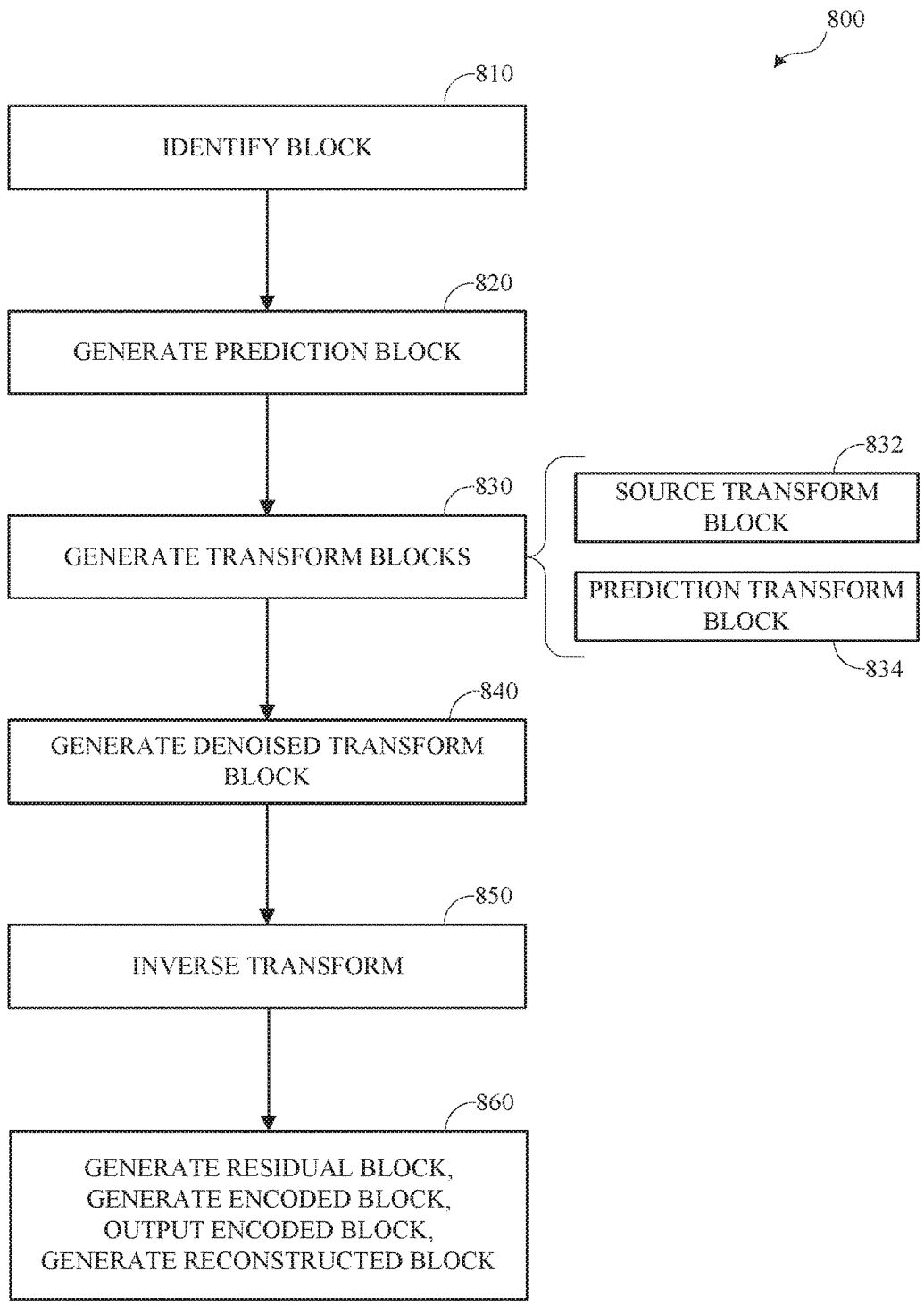
FIG. 8 is a diagram of an example of coding a video stream using frequency-domain denoising in accordance with implementations of this disclosure.

FIG. 8 is a diagram of an example of coding a video stream using frequency-domain denoising in accordance with implementations of this disclosure. In some implementations, an encoder, such as the encoder 400 shown in FIG. 4, may receive an input video stream, such as the input video stream 402 shown in FIG. 4, may encode the input video stream, such as the encoding shown in FIG. 4, and may output an encoded video stream, such as the compressed bitstream 404 shown in FIG. 4. In some implementations, encoding the video stream may include frequency-domain denoising 800. For example, an encoder, such as the encoder 400 shown in FIG. 4, may include a denoising unit (as shown using broken lines at 425 in FIG. 4), which may generate a denoised frame, or a portion thereof, based on the source frame, or a portion thereof, and a predicted frame, or a portion thereof, such as the predicted frame generated by the prediction unit 410 shown in FIG. 4. In some implementations, the encoder may include a combined prediction and denoising unit, a combined transform and denoising unit, or a combined prediction, transform, and denoising unit.

In some implementations, frequency-domain denoising 800 may include identifying a source block at 810, generating a prediction block at 820, generating transform blocks at 830, generating a denoised transform block at 840, inverse transforming the denoised block at 850, generating an encoded block at 860, or a combination thereof. In some implementations, frequency-domain denoising 800 may include frequency denoising, which may include combined spatial and temporal denoising, wherein the value of a denoised pixel may be based on the value of the pixel in the current frame, the value of a corresponding pixel in a reference frame, and the values of spatially-related pixels.

In some implementations, a source block may be identified at 810. In some implementations, a current frame of the input, or source, video stream may include multiple N×M blocks, such as the blocks shown in FIG. 6. For example, the source block may be a 4×4 block, a 64×64 block, or any other size block, such as shown in FIG. 6. In some implementations, a block from the source frame may be identified as the source block. In some implementations, each block from the source frame may be denoised on a block-by-block basis. For example, the blocks from the current frame may be denoised in an order, such as raster scan order.

In some implementations, a prediction block may be generated at 820. For example, a prediction block may be generated based on a reference frame using inter-prediction, such as the inter-prediction 410 shown in FIG. 4.

In some implementations, transform blocks may be generated at 830. In some implementations, a source transform block may be generated at 832 from the source block and a prediction transform block may be generated at 834 from the prediction block. For example, a transform unit, such as the transform unit 420 shown in FIG. 4, may generate a prediction transform block from the prediction block and may generate a source transform block from the source block. In some implementations, generating a transform block may include performing a block-based transform, such as a DCT transform, to generate frequency domain transform coefficients from a block of pixels, such as the source block or the prediction block.

In some implementations, a denoised transform block may be generated at 840. In some implementations, generating a denoised transform block may include applying a denoising function to the source transform block based on the prediction transform block.

In some implementations, the source transform block may be a function of a corresponding noiseless block, which may be referred to as a real block, and additive Gaussian noise. In some implementations, frequency-domain denoising may recover the real block as the denoised block. In some implementations, the prediction transform block may be a function of a real block corresponding to the reference block and additive Laplacian innovation. In some implementations, a frequency-domain denoising function may generate an expectation of the real block based on the source transform block and the prediction transform block.

In some implementations, B may indicate the Y plane of the source block in the pixel domain, $B_{x,y}$ may indicate the value the pixel in the row x and column y of B, h may indicate the height of the source block in pixels, w may indicate the width of the source block in pixels, $\beta$ may be the discrete transform-domain representation of B ($\beta$=dct(B)), $\beta_0$ may indicate the DC coefficient, $\beta_1, \beta_2, \ldots, \beta_{hw-1}$ may indicate the AC coefficients, P may indicate Y plane of the prediction of B in the pixel domain, and r may be the discrete transform-domain representation of P ($\pi$=dct(P)).

In some implementations, $\hat{\beta}$ may be the transform domain of the source block, $\beta$ may represent the noiseless signal, which may be the true or real signal, corresponding to the input block, n may represent noise added to the true signal during the generation of the source frame, and $\hat{\beta}$ may be expressed as the following:

$$\hat{\beta}=\beta+n. \qquad \text{[Equation 1]}$$

In some implementations, $\hat{\pi}$ may be the transform domain of the prediction block, $\pi$ may represent the noiseless signal, which may be the true or real signal, corresponding to the prediction block, e may represent the innovation, and $\hat{\pi}$ may be expressed as the following:

$$\hat{\pi}=\pi+e. \qquad \text{[Equation 2]}$$

In some implementations, denoising may include generating an estimate E of $\beta$ based on the source block and the prediction block, wherein x may represent an integration variable and dx may represent a quantity of the integration variable x that approaches zero, which may be expressed as the following:

$$E[\beta|\hat{\beta},\hat{\pi}]=\int_{-\infty}^{+\infty} xf(x|\hat{\beta},\hat{\pi})dx \qquad \text{[Equation 3]}$$

In some implementations, f may indicate a conditional probably density function of $\beta$ based on $\hat{\beta}$ and $\hat{\pi}$, which may be expressed as the following:

$$f(\beta|\hat{\beta},\hat{\pi}) = \frac{f(\hat{\beta},\hat{\pi}|\beta)f(\beta)}{f(\hat{\beta},\hat{\pi})} \qquad \text{[Equation 4]}$$

In some implementations, for a given true block, the noisy block and the prediction block may be independent, which may be expressed as the following:

$$= \frac{f(\hat{\beta}|\beta)f(\hat{\pi}|\beta)f(\beta)}{f(\hat{\beta},\hat{\pi})}$$ [Equation 5]

$$= \frac{f(\hat{\beta}|\beta)f(\beta|\hat{\pi})f(\hat{\pi})}{f(\hat{\beta},\hat{\pi})}$$

$$= \frac{f(\hat{\beta}|\beta)f(\beta|\hat{\pi})}{\frac{f(\hat{\beta},\hat{\pi})}{f(\hat{\pi})}}$$

$$= \frac{f(\hat{\beta}|\beta)f(\beta|\pi)}{f(\hat{\beta},\hat{\pi})}$$

In some implementations, f(n) may indicate a function of the noise, and the conditional probably density function may be expressed as the following:

$$f(\beta|\hat{\beta}) = f(\beta + n|\beta)$$ [Equation 6]
$$= f(n)$$

In some implementations, f(n) may be modeled with Gaussian distribution, which may be expressed as the following:

$$G_{0,\sigma}(x-\hat{\beta}).$$ [Equation 7]

In some implementations, f(e) may indicate a function of the innovation, and the conditional probably density function may be expressed as the following:

$$f(\beta|\hat{\pi}) = f((\hat{\pi}+e)|\hat{\pi}) = f(e)$$ [Equation 8]

In some implementations, f(e) may be modeled with Laplace distribution, which may be expressed as the following:

$$L_{0,b}(x-\hat{\pi}).$$ [Equation 9]

In some implementations, $f_c(\hat{\beta}-\hat{\pi})$ may indicate a convolution for the noise and the innovation function G*L at the point $\hat{\beta}-\hat{\pi}$, and the estimation may be expressed as the following:

$$E[\beta|\hat{\beta},\hat{\pi}] = \int_{-\infty}^{+\infty} x \frac{G_{0,\sigma}(x-\hat{\beta}) \cdot L_{0,b}(x-\hat{\pi})}{G*L(\hat{\beta}-\hat{\pi})} dx$$ [Equation 10]

In some implementations, an approximation of $E[\beta|\hat{\beta},\hat{\pi}]$ may be expressed as the following:

$$E[\beta|\hat{\beta},\hat{\pi}] = \int_{-\infty}^{+\infty} x \frac{G_{0,\sigma}(x-\hat{\beta}) \cdot L_{0,b}(x-\hat{\pi})}{G*L(\hat{\beta}-\hat{\pi})} dx =$$ [Equation 11]

$$\frac{1}{G*L(\hat{\beta}-\hat{\pi})} \int_{-\infty}^{+\infty} x G_{0,\sigma}(x-\hat{\beta}) \cdot L_{0,b}(x-\hat{\pi}) dx$$

In some implementations, i may index into a list $x_d$ of N x-values from 1 to u, each spaced by a distance Δ, such that Δ=u−l/N, and the integral may be approximated with a sum, which may be expressed as follows:

$$= \frac{1}{G*L(\hat{\beta}-\hat{\pi})} \sum_{i=0}^{N} \Delta \cdot x_i \cdot G_{0,\sigma}(x_i-\hat{\beta}) \cdot L_{0,b}(x_i-\hat{\pi})$$ [Equation 12]

The convolution may be approximated with a sum, wherein the bounds of the integrals may be equal, which may be expressed as follows:

$$= \frac{\sum_{i=0}^{N} x_i \cdot G_{0,\sigma}(x_i-\hat{\beta}) \cdot L_{0,b}(x_i-\hat{\pi})}{\sum_{i=0}^{N} G_{0,\sigma}(x_i-\hat{\beta}) \cdot L_{0,b}(x_i-\hat{\pi})}$$ [Equation 13]

In some implementations, $\min(\hat{\beta},\hat{\pi})-|\hat{\beta}-\hat{\pi}|$ may be identified as a lower bound and $\max(\hat{\beta},\hat{\pi})+|\hat{\beta}-\hat{\pi}|$ may be identified as an upper bound. In some implementations, the accuracy of the approximation and the cost of computation may increase with the number of points, N, and N may be determined based on metrics, such as the floating-point precision available, time, pixel precision, or a combination thereof. In some implementations, another approximation of the integral expression may be used.

Although not shown separately in FIG. 8, in some implementations, one or more frequency-domain cutoffs may be applied. For example, the current frame may include an object omitted from previous frames, such as a new object entering the captured scene, a prediction blocks for the portion of the frame including the new object may be predicted inaccurately or may be unpredictable, and a frequency-domain cutoff may be applied.

In some implementations, applying a frequency-domain cutoff may include determining whether a denoised coefficient value is in the range between the source coefficient value and the predicted coefficient value in the frequency domain. For example, a source coefficient $\beta_i$ may have the value 30, the corresponding prediction coefficient $\pi_i$ may have the value 26, the corresponding denoised coefficient may have the value outside the cutoff range, such as 32, and the value of the source coefficient $\beta_i$ may be used as the denoised value. In another example, a source coefficient $\beta_i$ may have the value 30, the corresponding prediction coefficient $\pi_i$ may have the value 26, the corresponding denoised coefficient may have a value within the cutoff range, such as 27, and the denoised coefficient value may be used.

In some implementations, applying a frequency-domain cutoff may include determining whether a difference between the denoised coefficient value and a corresponding source coefficient value is below a denoising frequency-domain similarity threshold. For example, denoising frequency-domain similarity threshold may be a percentage, such as 20%, the difference between the denoised coefficient value and the corresponding source coefficient value may be greater than the denoising frequency-domain similarity threshold, and the source coefficient may be used. In another example, the difference between the denoised coefficient value and the corresponding source coefficient value may be less than the denoising frequency-domain similarity threshold, and the denoised coefficient may be used. In another example, the difference between the denoised coefficient value and the corresponding source coefficient value may be greater than the denoising frequency-domain similarity threshold, and a value indicated by the denoising frequency-domain similarity threshold, such as the source transform coefficient multiplied by the sum of one (1) and the denoising frequency-domain similarity threshold, may be used as the denoised value.

In some implementations, generating the denoised transform block may include generating the denoised coefficients in a first pass and applying the cutoffs in a second pass. In some implementations, generating the denoised transform block may include generating the denoised coefficients and applying the cutoffs in a single pass.

In some implementations, generating the denoised transform block may include applying one or more block-based frequency-domain cutoffs. In some implementations, generating the denoised transform using a block-based frequency-domain cutoff may include identifying a block-based frequency-domain cutoff threshold and denoising source coefficients that are within the block-based frequency-domain cutoff threshold. For example, the source coefficient value may be above the block-based frequency-domain cutoff threshold, the source coefficient value may be used, and denoising may be omitted. In another example, the source coefficient value may be below the block-based frequency-domain cutoff threshold, and a denoised coefficient may be generated.

In some implementations, the denoised transform block may be inverse transformed to generate the denoised block at 850.

In some implementations, the encoder may generate the residual based on the denoised block and the prediction block at 860. For example, a prediction unit of the encoder, such as the intra/inter prediction unit 410 shown in FIG. 4, may subtract the prediction block from the denoised block to produce a residual block. Although not shown separately in FIG. 8, each block from the current frame may be denoised on a block-by-block basis, such as in raster scan order.

Although not shown separately in FIG. 8, in some implementations, one or more pixel-domain cutoffs may be applied. In some implementations, applying a pixel-domain cutoff may include determining whether a denoised pixel value is in the range between the source pixel value and the predicted pixel value. For example, the denoised pixel value may be between the source pixel value and the predicted pixel value and the denoised pixel value may be used. In another example, the denoised pixel value may be outside the range between the source pixel value and the predicted pixel value and the source pixel value may be used for generating the residual.

Although not shown separately in FIG. 8, in some implementations, one or more block-based pixel-domain cutoffs may be applied. For example, the total difference between the source block and the denoised block may exceed a block-based pixel-domain cutoff threshold, and the source block may be used for generating the residual.

Although not shown separately in FIG. 8, in some implementations, different heuristics may be used to determine whether the accuracy of the prediction block is above a denoising threshold, and denoising may be omitted if the accuracy is below the threshold. For example, a difference between the prediction block and the source block for a frequency or a group of frequencies may be above a threshold, and denoising may be omitted.

Although frequency-domain denoising is described with reference to a single reference frame, multiple reference frames may be used such that the denoised block is a function of the source block and multiple prediction blocks.

As indicated at 860, the residual block may be encoded, output, and reconstructed, such as described in relation to FIG. 4. Other implementations of the diagrams of frequency-domain denoising as shown in FIG. 8 are available. In implementations, additional elements of frequency-domain denoising can be added, certain elements can be combined, and/or certain elements can be removed.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/ processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   identifying a current source block from a current source frame from a source video stream;
   generating a prediction block for the current source block;
   generating a source transform block of the current source block by transforming the current source block into the frequency domain;
   generating a prediction transform block of the prediction block by transforming the prediction block into the frequency domain;
   generating, by a processor in response to instructions stored on a non-transitory computer readable medium, a denoised transform block based on an approximation of an integration of a product of the denoised transform block with a conditional probability function of the denoised transform block given the source transform block and the prediction transform block;
   generating a denoised block by inverse transforming the denoised transform block;
   generating a residual block based on a difference between the denoised block and the prediction block;
   generating an encoded block by encoding the residual block; and
   outputting or storing the encoded block.

2. The method of claim 1, wherein the current source block includes noise.

3. The method of claim 1, wherein generating the source transform block by transforming the current source block into the frequency domain includes applying a block-based transform to the current source block, such that the source transform block includes a plurality of source transform coefficients, and wherein generating the prediction transform block by transforming the prediction block into the frequency domain includes applying the block-based transform to the prediction block, such that the prediction transform block includes a plurality of prediction transform coefficients.

4. The method of claim 3, wherein the block-based transform is a discrete cosine transform.

5. The method of claim 1, wherein generating the denoised transform block includes denoising the source transform block based on the prediction transform block.

6. The method of claim 1, wherein generating the denoised transform block includes applying a frequency-domain cutoff.

7. The method of claim 6, wherein applying the frequency-domain cutoff includes applying a block-based frequency-domain cutoff.

8. The method of claim 1, wherein generating the denoised block includes applying a pixel-domain cutoff.

9. The method of claim 8, wherein applying the pixel-domain cutoff includes applying a block-based pixel-domain cutoff.

10. A method comprising:
    identifying a current source block from a current source frame from a source video stream;
    generating, by a processor in response to instructions stored on a non-transitory computer readable medium, an encoded block by encoding the current source block using frequency-domain denoising such that input noise in the current source block is reduced, wherein frequency-domain denoising includes:
      generating a first residual block based on a difference between a denoised block corresponding to the current source block and a prediction block, wherein no second residual block is generated based on a difference between the current source block and any prediction block, by:
        generating the prediction block for the current source block;
        generating a source transform block by transforming the current source block into the frequency domain;
        generating a prediction transform block by transforming the prediction block into the frequency domain;
        generating a denoised transform block by integrating a product of the denoised transform block with a conditional probability function of the denoised transform block given the source transform block and the prediction transform block; and
        generating the denoised block by inverse transforming the denoised transform block; and
      generating the encoded block by encoding the first residual block; and
    outputting or storing the encoded block.

11. The method of claim 10, wherein the current source block includes noise.

12. The method of claim 10, wherein generating the source transform block by transforming the current source block into the frequency domain includes applying a discrete cosine transform to the current source block, such that the source transform block includes a plurality of source transform coefficients, and wherein generating the prediction transform block by transforming the prediction block into the frequency domain includes applying the discrete cosine transform to the prediction block, such that the prediction transform block includes a plurality of prediction transform coefficients.

13. The method of claim 10, wherein generating the denoised transform block includes denoising the source transform block based on the prediction transform block.

14. The method of claim 10, wherein generating the denoised transform block includes applying a coefficient-based frequency-domain cutoff, applying a block-based frequency-domain cutoff, applying a pixel-based pixel-domain cutoff, or applying a block-based pixel-domain cutoff.

15. The method of claim 10, wherein encoding the current source block using frequency-domain denoising omits loop filtering.

16. The method of claim 15, further comprising:
generating a reconstructed block based on the encoded block, wherein generating the reconstructed block based on the encoded block includes loop filtering.

17. A method comprising:
identifying a current source block from a current source frame from a source video stream;
generating a prediction block for the current source block;
generating, a source transform block for the current source block by transforming the current source block into the frequency domain, wherein the source transform block is a first sum of a denoised transform block and a noise;
generating a prediction transform block for the prediction block by transforming the prediction block into the frequency domain, wherein the prediction transform block is a second sum of a noiseless prediction transform block and innovation;
generating, by a processor in response to instructions stored on a non-transitory computer readable medium the denoised transform block based on an integral of a model of a conditional probability density function of the noise and a model of a conditional probability density function of the innovation;
generating a denoised block by inverse transforming the denoised transform block;
generating a residual block based on a difference between the denoised block and the prediction block;
generating an encoded block by encoding the residual block; and
outputting or storing the encoded block.

18. The method of claim 17, wherein generating the denoised transform block includes applying a coefficient-based frequency-domain cutoff, applying a block-based frequency-domain cutoff, applying a pixel-based pixel-domain cutoff, or applying a block-based pixel-domain cutoff.

* * * * *